Nov. 11, 1941.   J. A. ELLIS   2,262,669
CHOKE
Filed March 13, 1940   2 Sheets-Sheet 1

Inventor
James A. Ellis
By L. F. Kendolph
Attorney

Nov. 11, 1941.    J. A. ELLIS    2,262,669
CHOKE
Filed March 13, 1940    2 Sheets-Sheet 2
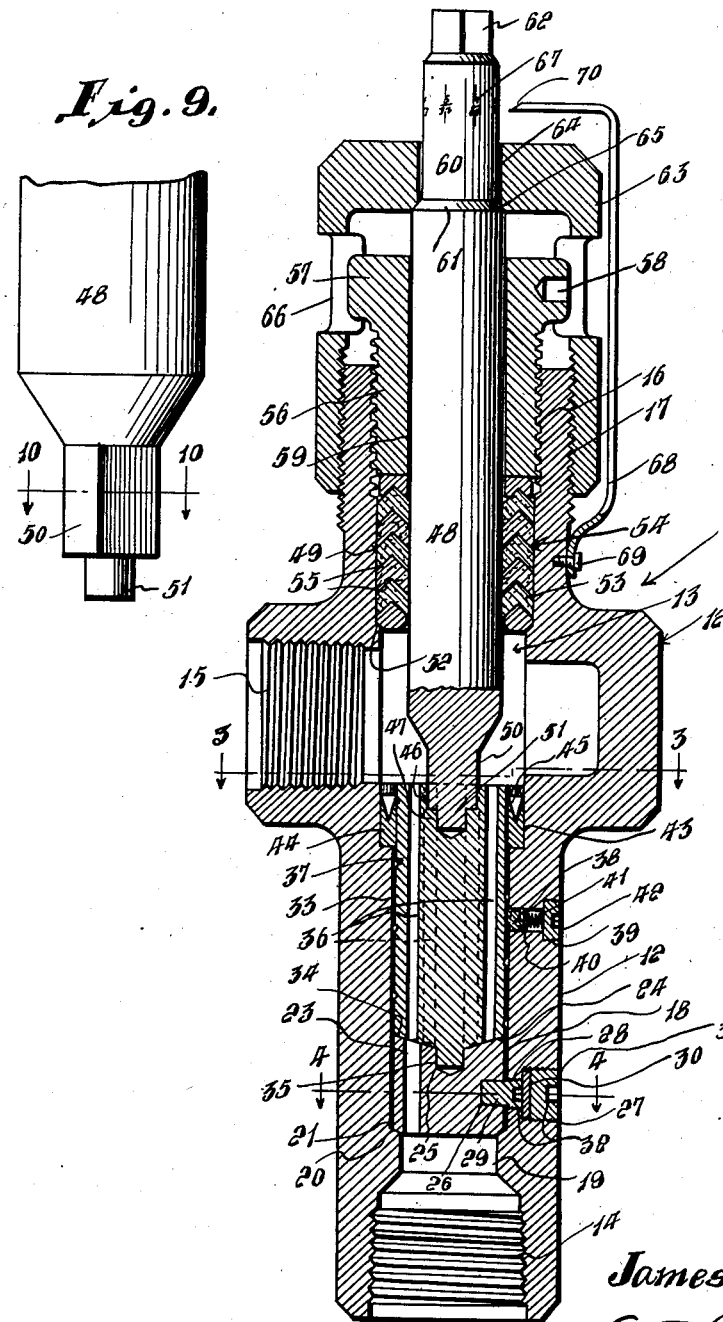
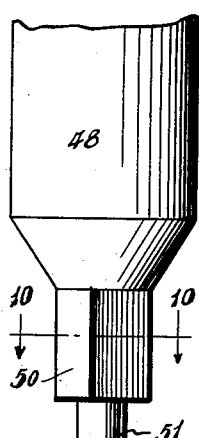
Inventor
James A. Ellis
By L. F. Randolph
Attorney Patented Nov. 11, 1941

2,262,669

UNITED STATES PATENT OFFICE 2,262,669

CHOKE

James Albert Ellis, Alice, Tex.

Application March 13, 1940, Serial No. 323,834

2 Claims. (Cl. 251—86)

This invention relates to an improved construction of choke for flow lines for restricting the flow of a fluid and for varying the extent of the flow restriction.

More particularly, it is an object of this invention to provide a flow restrictor capable of being readily mounted in flow lines through which a fluid is being forced under pressure for restricting the flow of the fluid and having means for simply and effectively varying the amount of the flow through the restrictor.

Still another aim of the invention is to provide a flow restrictor or choke including a coupling member adapted to be readily positioned in a flow line and provided with a fixed valve seat having an orifice extending therethrough and a valve body rotatably mounted in the coupling and having one end engaging the valve seat, said valve body having a plurality of passages of various sizes adapted to be selectively positioned to register with said orifice to vary the extent to which the flow through the choke or restrictor is restricted.

Still another aim of the invention is to provide an operator for rotating the valve body having means for detachably connecting said operator and valve body when in one position relatively to each other, and means associated with said operator for indicating the position of the various passages relatively to the orifice whereby the flow through the choke may be simply and effectively regulated with the utmost accuracy.

Still another aim of the invention is to provide novel lubricating means for effectively lubricating the rotatable valve body to prevent the valve body from binding against the bore of the coupling member or against the upper surface of the valve seat member due to the pressure of the fluid on the exposed end of the valve body.

Figure 1:
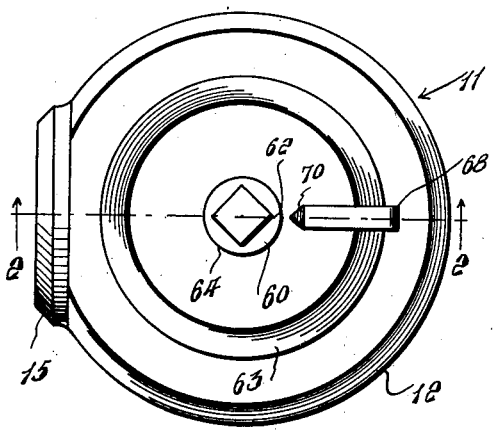
Figure 3:
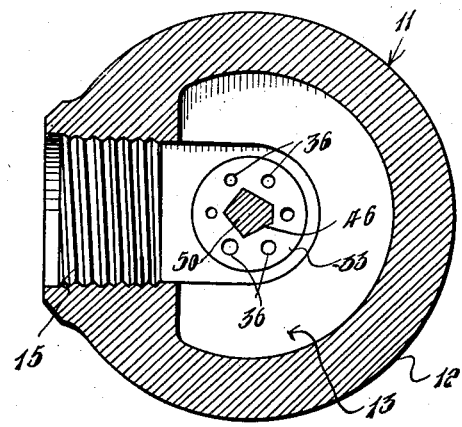
Figure 4:
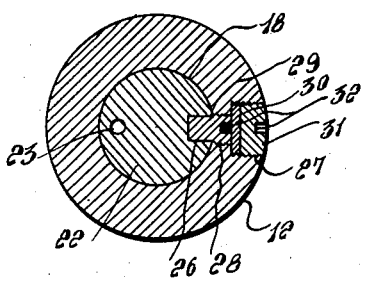
Figure 5:
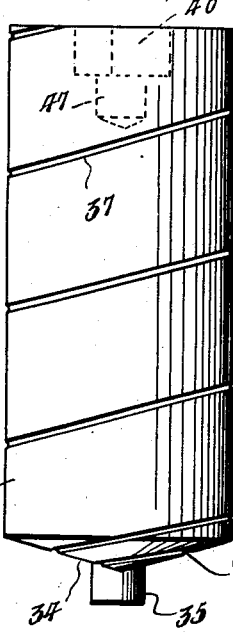
Figure 7:
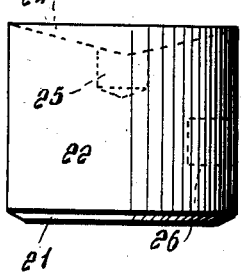
Figure 6:
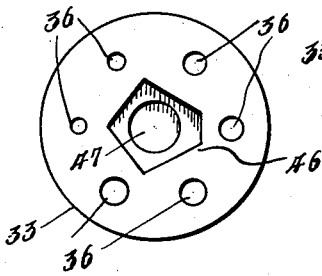
Figure 8:
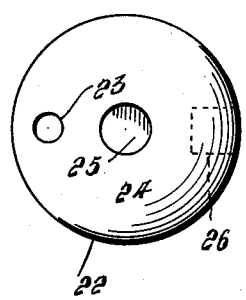

Other objects and advantages of the invention will hereinafter become more fully apparent from the following description of the drawings, which illustrate a preferred embodiment thereof, and wherein:

Figure 1 is a top plan view of the choke or flow restrictor,

Figure 2 is a longitudinal vertical sectional view taken substantially along the plane of the line 2—2 of Figure 1 with a portion of the stem shown in elevation, Figure 3 is a transverse sectional view taken substantially along the plane of the line 3—3 of Figure 2, Figure 4 is a similar view taken substantially along the plane of the line 4—4 of Figure 2, Figure 5 is an enlarged side elevational view of the valve body, shown detached, Figure 6 is a top plan view of the same, Figure 7 is a view similar to Figure 5 of the valve seat member, Figure 8 is a top plan view of the same, Figure 9 is an enlarged fragmentary side elevational view of the lower portion of the operating stem, and Figure 10 is a transverse sectional view taken substantially along the plane of the line 10—10 of Figure 9.

Referring more particularly to the drawings, wherein like reference characters designate like or corresponding parts throughout the different views, 11 designates generally the choke or flow restrictor which includes a coupling or casing 12 provided with a bore, designated generally 13, which extends longitudinally therethrough. The coupling 12 at the lower end of the bore 13, which is enlarged, as best seen in Figure 2, is internally threaded at 14, and intermediate of its ends the coupling 12 is provided with an internally threaded nipple 15 which opens outwardly of the member 12 at one end and communicates with the bore 13 at its opposite end. The opposite, upper end of the coupling 12 is internally threaded at 16 and externally threaded at 17.

Bore 13, between the point where the nipple 15 communicates therewith and its enlarged lower end is provided with a portion 18 having a restricted lower end 19 forming a beveled seat 20 for the beveled bottom portion 21 of a valve seat member 22 to engage for sealing the space between the periphery of the member 22 and the portion 18 of the bore 13. Member 22 is provided with an orifice 23 which extends longitudinally therethrough. Member 22 is provided with a concave or dished upper surface 24 having a cylindrical recess 25 at the center thereof and a recess 26 which opens outwardly of its periphery. Coupling member 12 is provided with an internally threaded recess 27 opening outwardly thereof provided with a restricted internally threaded inner end 28 which communicates with the bore portion 18 and which is adapted to register with the recess 26. A key 29 is provided with a threaded portion at its outer end to engage the threads of the recess portion 28 to position its inner end in engagement with the recess 26 to thereby key the valve seat member 22 in the bore portion 18. The key 29 is held in place by means of a gasket 30 and a threaded plug 31 which are disposed in the recess 27. Plug 31 is sized so that its threads engage the threads of the recess 27 to hold the gasket 30 in engagement with the outer end of the key 29, and as best seen in Figure 2, key 29 and plug 31 are each provided with a kerf 32 in their outer surfaces to receive a screw driver or similar tool, not shown, for inserting and removing said members.

A valve body 33, which is circular in cross section and of substantially the same diameter as the bore portion 18, is rotatably mounted therein above the seat member 22. The valve body 33 is provided with a tapered or convex lower end 34 and seats flush on the convex surface 24 of the seat member 22. End 34 is provided with a restricted, centrally disposed projecting shank 35 to engage the recess 25. As best seen in Figures 2 and 6, the valve body 33 is provided with a plurality of spaced passages 36 of various sizes, each of which extends longitudinally through the valve body 33. Passages 36 are all equally spaced from the axis of the valve body 33 and the orifice 23 is similarly spaced from the axis of the seat member 22 so that each of the passages 36 will register with the orifice 23 when the valve body 33 is revolved, for a purpose which will hereinafter become apparent. The largest passage 36 is of the same diameter or slightly smaller than the orifice 23. The valve body 33 is provided with a spiral lubricating groove 37 in its periphery, the lower end of which extends into the surface 34, as best seen in Figure 5. Coupling member 12 is provided with a port 38 which opens into the bore portion 18 and which is provided with an enlarged internally threaded outer end 39 which opens outwardly of the coupling 12. A lubricating wick 40 is mounted in the inner end of the bore 38 and is held in engagement with the periphery of the valve body 33 by a spring pressed follower 41 which abuts against the threaded plug 42 mounted in the portion 39 for furnishing a lubricant to the periphery of the valve body 33 and particularly to the lubricating groove 37 by means of which the lubricant is distributed to different portions of the periphery and to the bearing surfaces 24 and 34. Adjacent the upper end of the bore portion 18 an annular recess 43 is formed in the coupling member 12 and opens into the bore portion 18 to receive a sealing ring 44 which bears against the periphery of the valve body 33 to seal the clearance space between the valve body and bore portion 18. In order to more effectively prevent the passage of a fluid downwardly between the bore portion 18 and valve body 33, the upper edge of the sealing ring 44 is provided with a V-shaped annular notch 45 to receive any fluid passing downwardly therebetween which fluid will tend to expand the upper portion of the ring 44 to more effectively form the seal.

Referring particularly to Figure 6, the upper end of the valve body 33 is provided with a polygonal shaped recess 46 provided with a restricted cylindrical recess 47 at the bottom thereof. As best seen in Figure 2, a stem 48 extends through the upper portion 49 of the bore 13 and is provided adjacent its lower end with a restricted polygonal shaped shank 50 which, as best seen in Figure 10, is shaped and sized to correspond to the recess 46. The shape of the recess 46 and shank 50, as seen in Figures 6 and 10, respectively, is such that the shank 50 can be inserted into the recess 46 only when the valve body 33 and stem 48 are in one certain position relatively to each other, for a purpose which will hereinafter become apparent. Shank 50 is provided with a restricted circular portion 51 which engages the recess portion 47.

Bore portion 49 is restricted at its lower end to form an annular tapered shoulder 52 on which is seated the lower end of a packing 53 of a stuffing box 54. Packing 53 comprises a plurality of superposed rings 55, the intermediate rings thereof being chevron shaped in cross section, as best seen in Figure 2. A gland nut 56 is provided with an externally threaded shank for engaging the threads 16 of the bore portion 49 to compress the packing 53 against the shoulder 52. Gland nut 56 is provided with an enlarged head 57 having a recess 58 for receiving a spanner wrench, or other tool, not shown, for turning the nut 56. The intermediate portion of the stem 48 is journaled in the bore 59 of the nut 56 and in the packing 53.

Stem 48, at its upper end, is provided with a restricted portion 60 forming an annular beveled shoulder 61 therebeneath having a polygonal shaped portion 62 at its free end for receiving a wrench or other tool, not shown, for turning the stem 48 to turn the valve body 33. A socket nut 63 is internally threaded at its lower end to engage the threads 17 and is provided with an opening 64 in its head in which is journaled the lower part of portion 60. Opening 64 is provided with a beveled lower end 65 which bears against the shoulder 61 so that when the socket member 63 is rotated in a direction to draw it inwardly of the coupling 12 it will force the stem 48 downwardly to move the surface 34 of the valve body 33 into flush abutting engagement with the surface 24 of the valve seat member 22. Socket member 63 adjacent its upper end is provided with circumferentially spaced openings 66 by means of which a tool may be inserted to engage the recess 58 for turning the gland nut 56.

Above the socket member 63, stem portion 60 is provided with calibrations 67 including circumferentially spaced markings each of which is provided with indicia for indicating the diameter of a passage 36. The distance between said markings is equal to the distance between the passages 36. A pointer 68 is secured at one end by means of the fastenings 69 to the intermediate portion of the coupling member 12 and has its opposite free end 70, which is preferably pointed, disposed adjacent to the calibrations 67 so that the spaced markings thereon can be selectively alined with the end 70 of the pointer. The indicia and markings forming the calibrations 67 are so arranged relatively to the passages 36 that when a marking containing indicia indicating any certain size is alined with the end 70 the passage 36 of the size corresponding to that indicia will be in alinement with the orifice 23.

From the foregoing it will be seen that the choke or flow resistor 11 may be readily mounted in a flow line, through which a fluid is being forced under pressure by connecting one section of the flow line to the nipple 15 and an adjacent section thereof to the nipple 14 with the nipple 15 being disposed adjacent the source of the flow and the nipple 14 adjacent its outlet end. The fluid under pressure will enter the coupling 12 through nipple 15 to create a pressure in the intermediate portion of the bore 13. The fluid will be prevented from passing upwardly through the bore 13 by the stuffing box 54 and which, when the nut 56 thereof is tightened will seal the space between the bore portion 49 and the intermediate portion of the stem 48. As heretofore explained, the sealing ring 44 will prevent the fluid from passing downwardly between the valve body 33 and the bore portion 18 so that the only escape for the fluid is through the passage 36, which is alined with the orifice 23, through the orifice 23 and into the section of the flow line connected to the threaded end 14 of the coupling 12. The passages 36 not alined with the orifice 23 will be sealed at their lower ends by the engagement of the surface 34 with the surface 24, which parts are held in tight sealing engagement, as heretofore explained, by tightening the socket member 63 to force stem 48 and valve body 33 downwardly. It will thus be seen that the flow is restricted by the choke 11 to reduce the pressure in the pipe line, not shown, between the coupling 12 and its discharge end relatively to the pressure in its opposite end. By turning the stem 48, as heretofore explained, passages of different sizes may be alined with the orifice 23 to thereby selectively vary the extent of flow through the choke 11 and the extent of pressure in the outlet end of the flow line. A lubricating wick 40 functioning in conjunction with the lubricating groove 37 will prevent the fluid pressure on the upper end of the valve body 33 from causing the valve body to bind or freeze against the coupling 12 or the seat member 22.

Various modifications and changes are contemplated and may obviously be resorted to as only a preferred embodiment of the invention has been disclosed.

I claim as my invention:

1. A device of the class described comprising a connection having a bore extending longitudinally therethrough and a nipple opening laterally of said bore, intermediate of its ends, said connection having a high pressure chamber communicating with the nipple and disposed intermediate of the ends of the bore, a plug mounted in said bore adjacent its lower end, means for keying said plug in said bore, said plug being provided with a single orifice extending therethrough, a valve body mounted in the lower end of said bore and having one end seated on the upper end of said plug, the opposite end of the valve body extending to and forming a part of the wall of said high pressure chamber, means, communicating with the high pressure chamber of the device, for sealing the space between said bore and valve body, said valve body being provided with a plurality of passages of varying sizes, means extending through the upper end of said bore and keyed to said valve body for turning said valve body to bring the various passages thereof into registry with an orifice in said plug, sealing means disposed in the upper end of said bore to engage said turning means for sealing the upper end of the bore, the periphery of said valve body being provided with a spiral groove extending into its bottom surface, a port in said connection opening into the lower portion of said bore, and a lubricating wick mounted in said port for engaging the periphery of the valve body for supplying a lubricant to said spiral groove.

2. A choke for flow lines comprising a coupling member having a bore extending longitudinally therethrough and provided at its lower end with means for engaging a section of a flow line toward the outlet end thereof, said coupling being provided with a nipple intermediate of its ends for engaging another section of the flow line adjacent the inlet end thereof, for mounting the coupling therein, a valve seat member, having an orifice extending therethrough, mounted in said bore, adjacent its lower end, an elongated valve body, circular in cross section, mounted in the lower end of said bore to seat on the upper end of said valve seat member, between the valve seat member and nipple, said valve body being provided with a plurality of passages of various sizes extending longitudinally therethrough, said coupling member having a high pressure chamber, intermediate of the ends of the bore, communicating with the nipple and of which the upper end of the valve body forms a wall portion, a stem extending through the upper portion of said bore, a stuffing box in the upper portion of said bore and in which said stem is rotatably mounted for sealing the upper end of the bore, means for detachably keying said stem to said valve body when the parts are in a certain predetermined position relatively to each other, a port formed in the lower portion of said coupling and communicating with said bore, said valve body being provided with a spiral groove formed in its periphery and extending into its bottom surface, and a spring pressed lubricating wick detachably mounted in said port and contacting the periphery of the valve body for furnishing a lubricant to said spiral groove.

JAMES ALBERT ELLIS.